April 26, 1949. J. E. BRISTER ET AL 2,468,165
RESIN COVERED WIRE OR CABLE AND METHOD OF MAKING
Filed Oct. 22, 1943
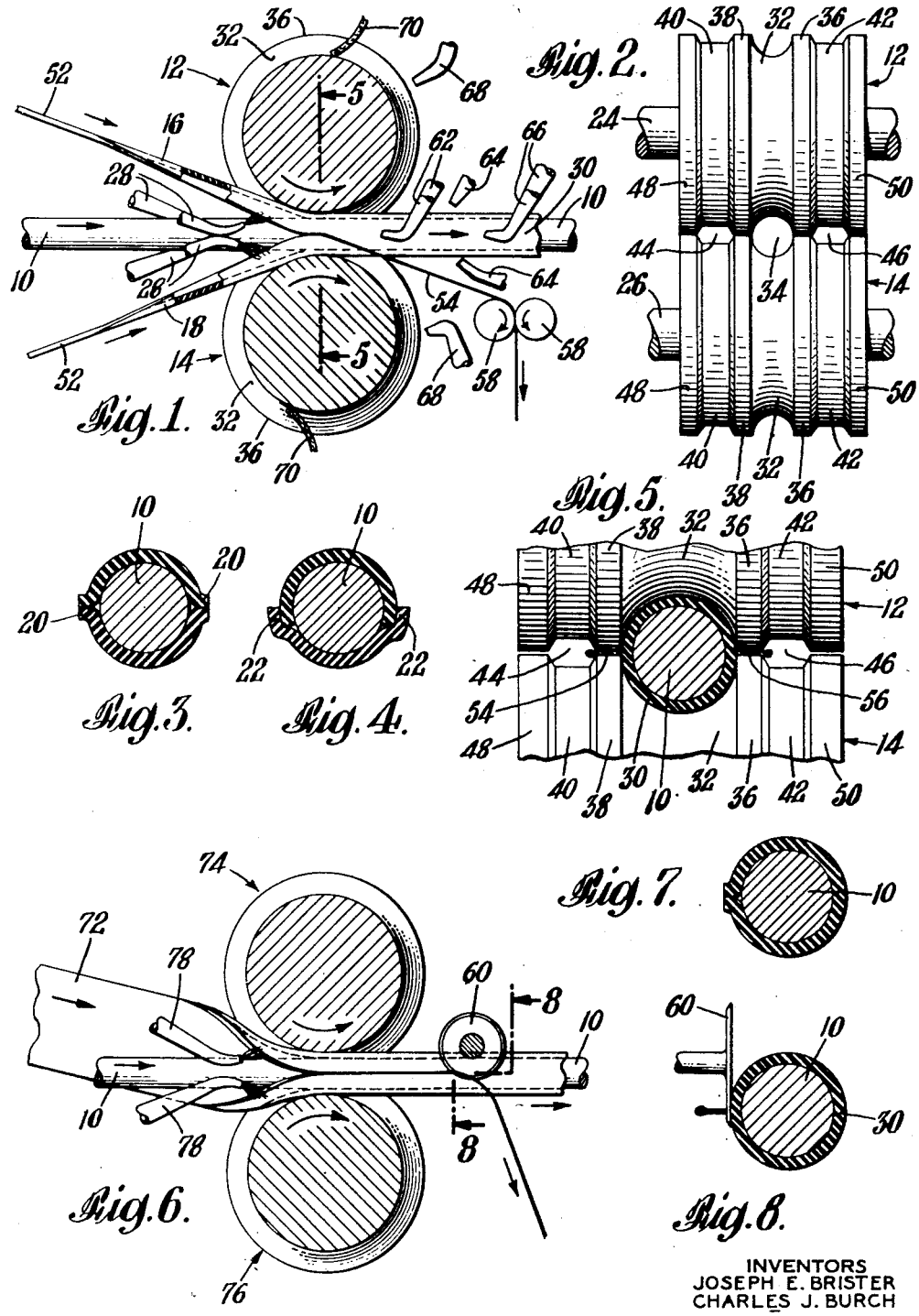
INVENTORS
JOSEPH E. BRISTER
CHARLES J. BURCH
BY *Scheffler*
ATTORNEY Patented Apr. 26, 1949

2,468,165

UNITED STATES PATENT OFFICE 2,468,165

RESIN COVERED WIRE OR CABLE AND METHOD OF MAKING

Joseph E. Brister, Summit, and Charles J. Burch, Plainfield, N. J., assignors to Bakelite Corporation, a corporation of New Jersey Application October 22, 1943, Serial No. 507,262

5 Claims. (Cl. 174—110)

1

This invention relates to an insulated conductor and to a method of producing it. The conductor is of the cable type as distinguished from the bus bar type, that is, it is made in long continuous lengths, and there is a continuous sheath of vinyl resin composition around a core which may be one or more metallic conductors with or without other insulation, waterproofing materials and the like under the sheath.

It has heretofore been proposed (see United States patent to Thomas, No. 271,750, February 6, '883) to insulate wires by feeding the wire together with strips of rubber, which are unvulcanized but ready for vulcanization, between rollers which are grooved so that as the wire and the rubber strips pass through the rollers in the grooves, the rubber strips are formed around the core. Among the disadvantages of rubber, however, are that at present there is a shortage of available rubber; where rubber is used, the covered wire requires a subsequent baking treatment to vulcanize the rubber; milled raw rubber (milling being required to distribute the vulcanizing agents, etc. through the rubber) is very weak and takes an excessive permanent set if heated while stretched; and if stretched around the wire in an unheated condition (so that its recovery is less affected), the meeting edges of the strips have a greater tendency to pull apart after the covered wire leaves the rolls. To the best of our knowledge, as the method of thus obtaining a rubber covered wire is actually practiced, the wire which has had the raw rubber applied, has to have an outer covering immediately applied over the rubber, for instance a spiral wrapping of cloth or paper tape, to protect the raw rubber during handling of the cable prior to vulcanization and to hold the raw rubber in place prior to and during the vulcanization step.

We have sought to overcome the disadvantages attendant upon the use of rubber and to effect improvements in both the process of insulating cables or wires and in the finished product. We have eliminated the vulcanizing step heretofore required with rubber and provide an improved cable with an insulating sheath which is resistant to aging, by taking advantage of the properties of vinyl resin compositions which properties have, to the best of our knowledge, heretofore been unutilized.

The invention will be explained in conection with the sheathing of cable with strips or tapes of a composition comprising a resinous copolymer of vinyl chloride and vinyl acetate as representative of resins of this type, for instance polymerized vinyl chloride, styrene, and others hereinafter mentioned.

The insulating characteristic of these resins has heretofore been recognized as well as their resistance to water, chemicals generally, aging and the like. The elasticity of compositions comprising the resins and plasticizers has also been recognized and taken advantage of in spirally wrapping tapes of such compositions around a wire or cable and then heating the cable to fuse together and seal the overlapping edges of the spirals. However, these resins and their compositions have the peculiar property that if stretched when cold they return to their original length although the recovery is rather slow as compared with that of the usual rubber band; and when heated, they lose their elastic properties progressively as the temperature increases but recover these properties upon cooling. It is this property of these compositions which we take advantage of in the longitudinal strip covering or sheathing of cable and because of it we are enabled to sheath cable in a very simple, efficient and expeditious manner with a minimum of waste and provide a cable with a uniform sheath of the composition and without the necessity of vulcanizing or further treating the sheath material.

To facilitate an understanding of the invention reference may be had to the accompanying drawing, in which:

Fig. 1 is a side view, partially in section, showing the manner in which two tapes of the composition may be applied to a cable;

Fig. 2 is an end elevation of the rollers of Fig. 1;

Fig. 3 is a section through a cable or wire having two tapes of the composition applied with a butt junction, the section being taken just prior to the assembly passing between the rollers;

Fig. 4 is a section through a cable or wire having two tapes applied with an overlapping junction, the section being taken just prior to the assembly passing between the rollers;

Fig. 5 is a partial section on line 5—5 of Fig. 1 viewed in the direction of the arrows;

Fig. 6 is a view similar to Fig. 1 but showing a single tape being applied to the cable;

Fig. 7 is a section through a cable or wire having a single tape of the composition applied with a butt junction, the section being taken just prior to the assembly passing between the rollers; and Fig. 8 is a view, partially in section, on line 8—8 of Fig. 6 showing a sheathed cable with a knife for trimming the flash.

The cable or wire or other core 10 is shown generically on the drawing, it being understood that this may be a bare metallic conductor or one already having applied to it varnishes or films or wrappings or coatings of any nature desired for insulation or protection against corrosion and the like.

As shown in Fig. 1, the cable is fed between rollers 12 and 14 together with tapes 16 and 18. The tapes are of the compositions described herein and are sufficiently wide for the edges to meet around the core 10 with any type of junction, for instance the butt junction 20 of Fig. 3 or the lap junction 22 of Fig. 4. The rollers are preferably fast to their respective shafts 24 and 26 (although there may be a loose mounting) and rotate, preferably being driven, with the linear peripheral speed at which the core and tapes move. Any suitable mechanisms (not shown) may be used to press the rollers together and, if desired, to drive them, and to pull the cable through the rollers. It is preferred that the rollers do not force the cable through as this might distort the sheathing.

A feature of the process is that the strains which are in the tapes when stretched and give the tapes their elastic recovery are released prior to the tapes passing between the rollers. A convenient way of releasing the strains is by heating the tapes. This may be accomplished by any suitable means for instance by electric heaters, hot air, ovens and the like but may conveniently be done by means of the jets 28 of hot air, gas or other flame. The amount of heating necessary to accomplish the purpose is more readily determined by observing the results on the first few inches of cable which pass between the rollers than by reference to temperatures of the tape as it is usually inconvenient to measure the temperatures, and the temperatures required will vary depending upon the composition used; for instance, a composition comprising a given amount of plasticizer and a low molecular weight resinous copolymer of vinyl chloride and vinyl acetate will release its strains at a lower temperature than a composition comprising a higher molecular weight copolymer of the same materials and less of the same plasticizer. Changes in the type of plasticizer and the inclusion of fillers of various types also cause a change in the temperature necessary to release the strains but whatever the composition of the tapes, there are two factors to be taken into account and correlated. One factor is that the edges of the tapes must be softened to such a point that they fuse or weld together in a unitary covering 30, as is shown in Fig. 5, and the other factor is that the body of the tape, that is the portion of the tape between the edges, must be heated sufficiently to release the strains of the tape to the extent necessary (but preferably only to that extent) so that the covering does not pull apart at the line of weld. Furthermore, it is preferred not to melt the tape composition even at the edges as this will have a tendency to give a non-uniform covering or sheath. The edges are merely heated enough to soften them sufficiently so that they unite under the pressure of the rollers to provide a weld or union or fusion at the junctures; and the body of the tape is heated sufficiently to release the strains so that the junctures do not tear apart after the covered cable leaves the rollers. It is preferred not to release the strains in the body of the tape beyond the extent necessary to prevent tearing of the tape. This does not even temporarily destroy all of the elastic recovery of the tape even though the tape be hot and allows the tape at all times and particularly immediately after passing through the rollers, to draw down on the core due to its own elastic recovery. If tearing or thin spots are observed at any part of the sheath, the situation may easily be corrected by decreasing the heat applied to (or alternatively cooling as will later be explained) that portion of the tape where the imperfection occurs and/or increasing the heat applied to either the edge or edges or body of the tape, as the case may be. Less heat may be used on the body and edges of the tape, the greater the pressure on the tape at the line of weld; and the thicker the sheating is at the line of weld, the less the strains have to be released between the edges. Having once adjusted and correlated the heating on the body and at the edges of the tape for any given machine and roller pressure, the operation is continuous for tapes of any given composition.

Stated in another way, the causes of any imperfections in the sheath are readily ascertained and the remedies are quite simple. A split or tear in the sheath may be (and will be, except at the exact line of weld) caused by uneven heating of the tapes or uneven cooling of the sheath and the remedy is to decrease the heat applied to the tape along the line at which the split occurs and/or cool the sheath along this line a little more quickly than the remainder of the sheath is cooled, the object being to have the sheath material regain its full elasticity substantially uniformly transversely of the cable. At the exact line of weld, the split may result from an imperfect union. The remedy for this is to increase the pressure on the rollers and/or heat the edges of the tapes to a higher temperature so that a perfect union is obtained. If the edges of the tape are given the additional heat, it may be necessary to heat the body of the tape correspondingly to release the strains more fully in the body of the tape and/or cool the weld line a little more quickly than the body of the tape so that, as previously stated, the sheath material regains its full elasticity substantially uniformly transversely of the cable.

The construction of the rollers is such that each roller has a groove 32 of such a contour that where the rollers meet, the opening 34 is of a size to fit tightly around the core and sheath. The groove 32 may have any contour to give the opening 34 any desired shape. Thus the contour of the grooves may be such as to give extra thickness to the sheath at the line of weld but usually the core is round, and a round, uniformly thick sheath is desired and therefore a process to give this type of sheathed cable is used for purposes of illustration. For the application of two tapes to the core there are land rings 36 and 38 on each side of the grooves 32, and flash grooves 40 and 42 outside of the land rings, the flash grooves forming flash pockets 44 and 46 where the rollers meet. Bearing lands 48 and 50 are illustrated but may be omitted if desired.

During the operation of the process and machine, as the tapes pass into the rollers (being properly positioned and delivered to the rollers by any suitable guiding means, not shown) they are gradually and automatically curved from their flat position 52 to a somewhat shallow elliptical shape which becomes deeper as the tapes move toward the nip of the rollers. Before the tapes enter the nip of the rollers, the center lines of the tapes meet the core and the action of the walls of the groove 32 adjacent the land rings is to complete the forming of the tapes around the core, stretching the tapes slightly across their width as the edges are brought toward each other.

Although the tapes may be heated to such an extent that they temporarily entirely lose their elastic recovery while thus heated, it is preferred that they not be heated to this extent; it is preferred that the tapes be applied to the core in a condition of slight lateral stretch and heated only to such an extent that the edges of the tapes do not separate at the line of weld and the tapes (or sheath) do not tear, which leaves the tapes (even though heated) with sufficient elastic recovery so that the sheath (the welded tapes) is under tension pulling down against or contracting around, the core. Even if the tapes are not stretched or are heated to such a high temperature that they temporarily lose all of their elastic recovery, the sheath will pull down against the core to some extent because the sheath contracts to some extent as it cools; but the sheath will hug the core more tightly if the two contractive effects are combined. The tapes are preferably under no longitudinal tension, or, at most, under only such longitudinal tension as is necessary to pull them from freely revolving reels on which they may be stored for feeding to the core. This prevents breaks in the tapes, feeds a tape of uniform thickness, and allows substantially the only stretch to be the slight and controlled lateral stretch occasioned by the forming rollers.

The forming of the tapes around the core beginning at the center lines of the tapes and core and gradually working toward the edges of the tapes, prevents the entrapment of air under the sheath. Incidentally, there is less weight of air than usual due to the fact that the air has been expanded by heat. Just prior to entering the nip of the rollers the edges of the tapes are brought together by the action of the meeting portions of the grooves 32 and any small amount of air which may be present is forced backwardly, that is, toward the still open portions of the tapes so that no air is trapped. At the nip of the rollers (along the line 5—5 of Fig. 1) the met edges of the tapes are pressed together with a high pressure to provide a homogeneous mass of material along the line of weld to give a continuous sheath. Any excess sheathing material is squeezed out between the land rings 36 and 38 as a thin fin 54 or 56 and larger quantities may be received in the flash pockets 44 and 46. With properly designed rollers, the fins are tissue thin and are easily torn away from the sheath by tearing rolls 58 (Fig. 1) or cut away by a knife 60 (Fig. 6) which may be stationary, driven or mounted for free rotation as desired.

After removing the fins, the assembly of the core and sheath is complete. The sheath cools very quickly, the time depending upon the thickness of the sheath and the temperature to which it was heated. Usually the cooling time is merely a matter of a minute or so, the core preferably being unheated and assisting in cooling the sheath. The core may, however, be heated or cooled, either uniformly or in any particular section to delay or expedite the cooling of the sheath adjacent the heated or cooled portions of the core. Upon cooling, the sheath material regains its elasticity and pulls tightly against the core. No further treatment of the sheath as such is required although, of course, any desired additional sheathing or armor may later be applied; for instance, no wraping or vulcanization step is required as is necessary with rubber; and there is no necessity for cement to be used under the sheath, in fact although cement may be used under the sheath it is somewhat of a detriment because it tends to form blisters, particularly if it contains volatiles and especially materials which volatilize under heat, and the cement, if in a cementitious condition may prevent that slippage of the sheathing material and adjustment of the sheath which occurs as the sheath cools and regains its elastic recovery and which enables the sheath to move slightly as it contracts around the core to hug the core and give an even, smooth covering or sheath which is under substantially uniform tension transversely of the cable.

In case it is desirable to control the cooling of the sheath throughout or to permit one portion to be cooled more quickly or more slowly than another, auxiliary heating and/or cooling means may be used. As shown in Fig. 1, such means may be the nozzles 62 and 64 arranged to direct flame or hot or cold air over the entire transverse section of the sheath or over any particular portion. For example, if it is desired to cool the entire sheath rather quickly, air may be blown against the sheath from all of the nozzles and the air may be refrigerated or not depending upon the cooling desired. Also, if the sheath should show any tendency to tear, it may be desirable to direct cold air onto the portions of the sheath which exhibit this tendency and direct warm air or flame toward the other portions of the sheath. For instance, if the sheath exhibits any tendency to become thin or to tear or separate along the line of weld, a blast of cold air may be directed from the nozzles 62 against the weld line to increase the strength of the composition at this portion of the sheath. Alternatively or in cooperation with the cold air from the nozzles 62, hot air or flame may be directed from the nozzles 64 to keep the sheath composition warm where the heat is applied and prevent the composition at this point from resuming its elasticity until the composition has cooled at the weld line. Again, the nozzles 62 may be used to direct heat toward the point at which the fin 54 is torn from the sheath to facilitate the tearing and to flow any irregular edges which may result from the tearing; the nozzles 64 may keep the composition hot at the central portions of the sheath to keep the strains released and the nozzles 66 cool the line of weld as and for the purposes previously described. Any type of heating or cooling means may be used and all such means are perferably universally adjustable toward, from, across and longitudinally of the tapes and sheath (as are the heating means 28) to put the heat or cold at the exact place desired.

After the machine has been in operation for a time, the rollers 12 and 14 may become so heated that the composition has a tendency to adhere to them. Whether or not this tendency occurs, depends in large measure upon the composition and to what temperature it is heated, upon the proximity of the heating means to the rollers and upon the pressure used on the rollers which develops heat due to friction or deformation of the tapes, and the like. To overcome any tendency for the composition to adhere to the rollers, they may be cooled, for instance by a blast of air or spray of water from nozzles 68 or they may be wiped as by a wiper 70 which provides a film of release agent, for instance water, oil or the like to the surfaces of the rollers. A film of water is preferred because it is low in cost and is both a cooling medium and a release agent, the vinyl resin compositions being, in general, quite resistant to attack by and non-adsorptive of water, particularly during the short time that they may be subjected to moisture on the rollers, those compositions which are of most value in sheathing cables being highly resistant to water.

The auxiliary heating and cooling means and the means for cooling and filming the rollers are described in order that a universally adaptable machine and process may be disclosed. Their use is, in general, not required as cables have been sheathed quite satisfactorily merely by adjusting the heaters 28 and the pressure on the rollers 12 and 14 so that the tapes are properly heated and the edges are forced together with sufficient pressure that as the cable cools naturally at room temperatures no tearing or weak or thin spots develop either at the line of weld or elsewhere in the sheath.

As is illustrated in Figs. 6, 7, and 8, a single tape 72 may be used for the sheath instead of the plural tapes. For application of a single tape, the rollers 74 and 76 may be identical with rollers 12 and 14 although it is somewhat preferable to use rollers which omit one of the flash pockets 44 or 46. The tape 72 may be sufficiently wide to allow rollers 74 and 76 to bring together the edges of the tape with either the butt joint of Fig. 3 or the lap joint of Fig. 4. In Fig. 7 is shown the single butt joint formed when a single tape of proper width is used. Fig. 8 illustrates the sheath formed from a single tape, this sheath being to all intents and purposes the same as that formed by the plural tapes. The heating means 78 may be similar to the heating means 28 and auxiliary heating and cooling and filming means may be used as previously described.

Tapes of substantially any vinyl resin composition may be used. It is generally preferred, however, that they contain a high proportion of halide which renders them fire-resistant. Thus the preferred tapes are based either on a polyvinyl halide or a conjoint polymer of a vinyl halide and a vinyl ester of a lower aliphatic acid, that is vinyl formate, acetate, propionate, butyrate, valerate, or caproate. Polyvinyl chloride and conjoint polymers of vinyl chloride and vinyl acetate are readily available on the market as are numerous other vinyl resins, for instance resinous styrene, resinous polyvinyl butyral, polyethylene resins, and the like which may be made into thermoplastic elastic plastic compositions. While a polyethylene resin may not, from a chemical-structure point of view, be considered the same as a vinyl resin, it (and its plasticized compositions) behave quite like the vinyl resins and hence it is included within the scope of the present invention and as the equivalent of the vinyl resins and within the term "vinyl resins."

In general, the higher the polymerization of the basic material, the tougher and more chemically resistant and more desirable are its properly plasticized compositions. Also, the higher the polymerization of the basic material, the more difficult it may be to make the material or its compositions unite at the weld line but this can be overcome by increasing the pressure on the rollers and/or the temperature of the edges of the tape. Any suitable plasticizer may be used, preferably one which is water insoluble, fire-resistant and which does not detract too much from the desirable electrical properties of the resin, for instance the aryl phosphates, examples being triphenyl- and tricresyl-phosphate. The plasticizers may also be chosen with a special purpose in view with relation to the basic material used and the welding of the tape edges; for instance, tricresyl phosphate has a tendency to give at elevated temperatures, compositions having a more tacky surface than does dibutyl phthalate and the phosphate may thus be used where the weld is to be made at lower temperatures and pressures. As previously stated, however, the common feature of the vinyl resins is that they and their compositions can, merely by proper adjustment of heating and cooling, be made to lose a large part of their elastic recovery and heat seal or weld and then recover their elasticity in a very short time after the seal or weld is effected.

Substantially any composition which is based upon a vinyl resin and which can be extruded, can be applied according to the present invention but it is preferred that the amount of lubricants such as are frequently used in extrusion compositions be reduced or omitted. In extrusion compositions, lubricants are used to prevent the compositions from adhering to the hot walls of the reservoir, extrusion chamber and die but they have a tendency to prevent adherence of the composition at the line of weld when used according to the present invention. Welding at the line of weld can be obtained, however, even with the lubricated compositions when used according to the present invention, by increased temperatures at the edges of the tapes and increased pressures on the rollers. In further explanation of this matter, there is no portion of the apparatus for applying tapes according to the present invention, to which the tapes could adhere except the rollers and these may be cooled or wiped with a release agent, if necessary and as previously stated, to prevent such adherence; but if the tape composition contains a lubricant, as may be required in the manufacture of the tapes per se, the cooling or wiping of the rollers is generally unnecessary. The following compositions are suitable for tapes to be used according to the present invention; the parts are by weight and the lubricants may be used or not, as desired.

*Example 1*

A composition may be made by cold mixing 76 parts of a powdered resinous copolymer of vinyl chloride and vinyl acetate, 1 part of lead stearate, 2 parts of white lead, 1 part of mineral oil and 20 parts of tricresyl phosphate. The mixing may be done in any standard mixer. The mixture should be homogeneous in approximately 30 minutes. This material is fluxed and milled on a conventional two-roll mill. The roll temperature should be between approximately 135° and 149° C. A 30 pound charge is placed on the rolls if the roll size is about 16 inches by 42 inches. The rolls are adjusted to approximately a 1/8 inch opening to give a small bank and thus insure good compounding. The sheet is cut from the roll and turned about every two minutes. The total milling time is approximately 15 minutes at the end of which the sheet is cut from the rolls.

The resin referred to above contains from about 93% to 95% vinyl chloride and the average molecular weight as determined by Staudinger's formula is about 24,000. The white lead is a stabilizer for the resin and the mineral oil is a lubricant. The lead stearate is a combined lubricant and stabilizer. The tricresyl phosphate is a plasticizer. This composition is rather stiff but elastic at the usual room temperatures of about 18° C. to 28° C.

The material thus compounded may be made into tapes in any suitable manner; for instance, the composition may be extruded in the form of a tape of the desired width and thickness; or a wide, long sheet of the proper thickness may be formed by extrusion or by calendering, this sheet then being cut to give tapes of the desired width; or tapes of the proper width and thickness may be cast from a fluid solution, emulsion or other mixture; or sheets so cast may be cut into tapes. In general, the tapes are from 5 to 125 mills in thickness and the width of the tapes is dependent upon the circumference of the core. Tapes of substantially any thickness and width may be applied.

*Example 2*

Compositions for tapes which are quite flexible at room temperatures may comprise from about 60 parts to about 70 parts of the resin of Example 1, about 1 part of lead stearate (a combined stabilizer and lubricant) and from about 29 parts to 39 parts of a plasticizer, for instance an aryl or alkyl ester exemplified by the aryl and alkyl phosphates and phthalates, such as tricresyl phosphate and di(2-ethylhexyl) phthalate. Tapes may be made from this composition in the manner previously described.

*Example 3*

As polyvinyl chloride is somewhat harder than the internally softened copolymer of vinyl chloride and vinyl acetate, tape compositions based on polyvinyl chloride usually require a somewhat higher proportion of plasticizer. The following are examples of tape compositions comprising a polyvinyl chloride having an average molecular weight of about 17,000 as determined by Staudinger's formula.

A composition is made comprising approximately 55 parts of said polyvinyl chloride, 3 parts of white lead, 1 part of mineral oil, 1 part of carbon black, 20 parts of tricresyl phosphate and 20 parts of di(2-ethylhexyl) phthalate. Tapes are made of this composition in the manner previously described.

*Example 4*

A composition is made comprising approximately 60 parts of the polyvinyl chloride of Example 3, 3.5 parts of white lead, 1.5 parts of carnauba wax or mineral oil, 1 part of carbon black or titanium dioxide, 14 parts of tricresyl phosphate and 20 parts of dibutyl sebacate. Tapes are made of this composition in the manner previously described.

*Example 5*

A composition is made comprising approximately 55 parts of the polyvinyl chloride of Example 3, three parts white lead, 1 part of calcium stearate, 1 part of carbon black, 10 parts of whiting, and 30 parts of tricresyl phosphate. Tapes are made of this composition in the manner previously described.

*Example 6*

In the manner previously described, a composition is made comprising approximately 10 parts by weight of polystyrene and 90 parts by weight of polyisobutylene. The polystyrene preferably has an average molecular weight of about 85,000 although the average molecular weights may range from about 50,000 to 200,000. The polyisobutylene preferably has an average molecular weight between about 100,000 and 120,000 and is a plasticizer for the polystyrene although, due to its rubbery characteristics it gives a good composition in conjunction with the polystyrene and is not strictly a plasticizer as is tricresyl phosphate or dibutyl sebacate. The average molecular weight of the polyisobutylene may be as low as 80,000, but it is usually desirable to use the higher molecular weight material as it provides a tougher and more elastic compound. The percentage of the polyisobutylene used in the composition will vary somewhat with its molecular weight and the molecular weight of the polystyrene to compensate for the variation in physical properties of these materials in order to give a product having the desired physical properties as previously described. Lubricants, such as paraffin or other waxes, fillers, coloring materials, stabilizers and the like may be added as desired.

*Example 7*

A composition suitable for tapes may also comprise 75 parts of polystyrene with a preferred average molecular weight of about 85,000 and 25 parts of polyisobutylene with a preferred average molecular weight of between about 100,000 and 120,000. As indicated in Example 6, various other molecular weight materials may be used and lubricants, fillers, coloring materials and the like may be incorporated.

*Example 8*

A composition using a lubricant may comprise 20 parts of the polystyrene and 78 parts of polyisobutylene of Example 7 together with 2 parts of paraffin wax.

*Example 9*

In the manner previously described, a tape composition may be made comprising 70 parts by weight of a polyvinyl butyral resin, 20 parts of triethylene glycol dioctoate and 10 parts of lead stearate. The polyvinyl butyral resin used had an average molecular weight of about 12,600 (Staudinger viscosity method). Similar resins having average molecular weights from 10,000 to 30,000 may be used. The higher the molecular weight, the harder is the resin and the larger is the proportion of the plasticizer which will have to be used.

*Example 10*

A composition may be made comprising approximately 10 parts by weight of polyethylene resin having a 32 second flow and 90 parts by weight of polyisobutylene having a preferred average molecular weight from approximately 100,000 to 120,000. The flow of the polyethylene resin is determined on the flow testing apparatus described in the patent of Rossi and Peakes, No. 2,066,016, granted December 29, 1936. In determining the flow of the resin, the sample charge is an 0.5 gram pellet. The molding pressure on the pellet is 700 pounds per square inch and the temperature of the mold is 135° C. The bore is 1/8 inch in diameter. With this apparatus and under the above conditions, the time for the resin to flow 1½ inches in the bore is measured in seconds and a resin referred to as having a "32 second flow" requires 32 seconds to flow 1½ inches in the bore. Polyethylene resins having flow times up to 100 seconds may be used in tape compositions although the proportion of polyisobutylene may have to be raised or a softer (lower molecular weight) isobutylene may be used. Thus, the average molecular weight of the polyisobutylene may be as low as 80,000.

Example 11

In the manner described in Example 10, compositions may be made comprising up to 90 parts by weight of the polyethylene resin (32 second flow) with the amount of polyisobutylene adjusted to give a total of 100 parts by weight. If a lubricant is desired, approximately 2 parts by weight of paraffin wax may be added to the composition.

In the above examples, the carnauba wax, paraffin wax, calcium stearate, and mineral oil are lubricants but any other suitable lubricants may be used. Lead stearate is a combined lubricant and stabilizer. The white lead is primarily a stabilizer although it is also a pigment and a filler. The carbon black and titanium dioxide are principally coloring materials although they also act as fillers. The whiting is a filler. Suitable amounts of other fillers, for instance barytes, fine clays and the like, and coloring materials, for instance other pigments and dyes and the like, may be incorporated if desired. The triethylene glycol dioctoate, dibutyl sebacate, tricresyl phosphate and dioctyl phthalate are plasticizers although other suitable plasticizers, for instance methyl acetal ricinoeate, triphenyl phosphate, dibutyl phthalate and the like, may be used. Where the plasticizers have primarily a plasticizing action, the amount of plasticizer may range up to about 50% of the composition. The polyisobutylene has a plasticizing action although, as previously stated, it is also a thermoplastic resinous material and is used not only as a plasticizer but to replace a portion of the basic resin; and for this reason it may be used in amounts up to approximately 90% by weight of the composition. Any of the usual stabilizers may be substituted for those given and are usually used in amounts from about 2% to about 5% of the weight of the resin.

The invention may be applied to wires, cables and other cores of all sizes but, in practical application, is particularly adapted to covering wires or cables of the larger sizes, say from about ½ inch in diameter to the larger sizes, say 4 or 5 inches in diameter, with a uniform sheathing in an expeditious manner. The sheath is applied very rapidly (up to 100 feet per minute on a cable ¾ inch in diameter) as compared with extrusion methods (up to 20 feet per minute on the same size cable) as, in extrusion methods a very delicate balance has to be maintained between all factors such as worm and die pressure, temperature of the cable, size of the cable, internal friction of the material and the like, and the entire mass of material has to be heated to the proper flowable state and while heating it has to be worked so that the entire mass is at a uniform temperature and free from lumps. In extrusion methods, too much composition may come from the die onto the cable if the cable runs too slowly or the pressure on the composition is too great for the cable speed or the composition is too hot; too little composition will come from the die under the reverse situation. The covering will be uneven and will have an uneven wall thickness and outside diameter, if the pressure varies for a set cable speed or if the cable speed varies or if the temperature of the composition varies; and the covering will also be uneven if there are lumps in the plastic composition during extrusion as lumps which are too large to pass between the die wall and the cable leave streaks on the cable where there is no insulation; and even if the lumps are small enough to pass out of the die, they are very noticeable on the finished cable and give an uneven coating. All of these factors are eliminated by the application of tapes according to the present invention.

Also, the steps of wrapping the core or using a cement under the sheath (which, practically, is a necessity where a cable is covered with unvulcanized rubber) and then vulcanizing are avoided; and heating of the wire or cable is unnecessary although required for vulcanizing rubber. This not only saves the labor and equipment cost of the wrapping and vulcanization steps and the necessary fuel and time required for these operations, but it enables a cable to be built with inner layers of insulation or protecting media which might deteriorate or run or otherwise become displaced at the temperatures required for vulcanization.

As previously stated, the usual cable is round and a feature of the invention is that a sheath of uniform thickness can be applied quite easily as disclosed herein. However, by using rollers of proper configuration and by using tapes of proper cross-sectional configuration, width and thickness, cables of oval and other shapes may be sheathed. It is contemplated that, for instance, the sheathing at the line of weld may be thicker than at other portions; also where a sheathed cable is designed to be supported in a certain position, it may be desirable for one portion of the sheathing to be thicker than another portion and in such a case one of the tapes in Fig. 1 may be much thicker than the other or the single tape of Fig. 6 may be thicker in certain portions than in others, the tapes being applied and the configuration of the rollers being designed so that the thicker portions of the sheath appear on the cable where desired. It is also to be understood that where a plurality of tapes are applied, as in Fig. 1, the tapes need not have the same composition although their compositions must be such that they weld together; one tape may be harder or softer or more elastic than another or have a different softening temperature. However, by correlation of the heating and cooling means any tape may be heated to the temperature required for welding the edges and releasing the strains and then the sheath also may be heated or cooled as required to keep the strains released while the weld line cools with the end in view that the sheath shall not split or tear at the weld line or elsewhere.

It is also to be understood that the preferred tapes have no unstretchable backing or center of materials such as paper or metal or unstretchable fabric which will prevent the tapes from contracting around the core. However, if the tapes comprise a center or backing, it is preferably stretchable and quite open, for instance like cheesecloth and if there is a backing it is preferably applied on only one face of the tape so that the tapes may be applied to the core with the unbacked faces meeting where the weld is effected although, as the rollers may operate under extremely high pressures, it is possible for sufficient of the composition to be squeezed through an open backing to effect the weld.

In the following claims, the term "cable" is used generically to include a wire or other core which is usually flexible and may or may not have coatings or wrappings or sheathings and the like applied prior to the application of the sheathing applied according to the present invention; and the term is used to indicate such cores and the like as are manufactured in the long lengths which are, among those skilled in the art, referred

What is claimed is:

1. A cable carrying an elastic sheath tensioned at a right angle to its length and comprising a tape of a composition comprising a polyvinyl resin and having the property of progressively losing its elasticity upon being heated and of recovering elasticity upon cooling and of welding to a similar composition under heat and pressure, said tape being laid longitudinally along the cable and having a longitudinal welded seam, the sheath firmly gripping the core of the cable, the portion of the sheath at the welded seam having an elasticity different from the elasticity of other portions of the sheath.

2. A cable carrying an elastic sheath tensioned at a right angle to its length and comprising a tape of a composition comprising a polyvinyl resin and having the property of progressively losing its elasticity upon being heated and of recovering elasticity upon cooling and of welding to a similar composition under heat and pressure, said tape being laid longitudinally along the cable and having a longitudinal welded seam, the sheath firmly gripping the core of the cable, the portion of the sheath at the welded seam having less elasticity than the other portions of the sheath.

3. Method of sheathing a cable with an elastic composition comprising a polyvinyl resin containing from about 88% to 100% of vinyl chloride polymerized therein together with a plasticizer for said resin in an amount up to about 100% of the weight of the resin and up to about 10% based on the weight of the resin of a stabilizer for said resin, said composition having the property of progressively losing its elasticity upon being heated and recovering the elasticity upon cooling, which method comprises transversely stretching a tape of the composition and heating the central portion of the tape to a temperature sufficient to remove a portion of the elasticity in the composition and heating a longitudinal edge portion of the tape to a different temperature sufficient to weld the longitudinal edge portion to another longitudinal edge portion, elliptically curving the tape transversely and laying the longitudinal center portion of the tape longitudinally along the cable and progressively bringing the outer portions of the tape into contact with the cable until a longitudinal edge portion meets another edge portion in welding condition, pressing together the meeting longitudinal edge portions to unite them to form a sheath enclosing the cable, and cooling the assembly, the heating and cooling being correlated so that the elasticity of the composition is regained substantially uniformly transversely of the sheath.

4. Method of sheathing a cable with an elastic vinyl resin composition having the property of progressively losing its elasticity upon being heated and of recovering elasticity upon cooling and of welding to a similar composition under heat and pressure, which method comprises: heating the body portion of a tape of said composition, away from the edges, to a temperature sufficient to release a portion of the elastic strains; heating a longitudinal edge portion of the tape to a different temperature sufficient to weld the longitudinal edge portion to another longitudinal edge portion; laying the tape longitudinally along a cable, forming the tape around the cable and stretching the tape transversely of its length; pressing together, to effect a weld, the longitudinal edge portions which have been heated to a welding temperature, to form a sheath around the cable, and cooling the assembly; the heating of said longitudinal edges and the heating of said body portion to release the strains, and the transverse stretching of the tape being correlated so that the sheathing is under tension transverse of the length of the tape and firmly presses against the cable and the elastic strains transverse of the length of the tape are not entirely released but are released to a point where the sheathing does not break as the assembly cools.

5. Method of sheathing a cable with an elastic vinyl resin composition having the property of progressively losing its elasticity upon being heated and of recovering elasticity upon cooling and of welding to a similar composition under heat and pressure, which method comprises: heating the body portion of a tape of said composition, away from the edges, to a temperature sufficient to release a portion of the elastic strains; heating a longitudinal edge portion of the tape to a higher temperature which is sufficient to weld the longitudinal edge portion to another longitudinal edge portion; laying the tape longitudinally along a cable, forming the tape around the cable and stretching the tape transversely of its length; pressing together, to effect a weld, the longitudinal edge portions which have been heated to a welding temperature, to form a sheath around the cable, and cooling the assembly; the heating of said longitudinal edges and the heating of said body portion to release the strains and the transverse stretching of the tape being correlated and correlated with the cooling so that the sheathing is under tension transverse of the length of the tape and firmly presses against the cable and the elastic strains transverse of the length of the tape are not entirely released but are released to a point where the sheathing does not break as the assembly cools.

JOSEPH E. BRISTER.
CHARLES J. BURCH.

REFERENCES CITED

The following references are of record in the file of this patent:

UNITED STATES PATENTS

| Number | Name | Date |
|---|---|---|
| 252,262 | Sawyer | Jan. 10, 1882 |
| 692,013 | Heyl-Dia | Jan. 28, 1902 |
| 1,886,600 | Smidth | Nov. 8, 1932 |
| 2,157,049 | Bartoe | May 2, 1939 |
| 2,161,766 | Rugeley | June 6, 1939 |
| 2,176,153 | Semon | Oct. 17, 1939 |
| 2,179,973 | Alexander | Nov. 14, 1939 |
| 2,183,811 | Homan | Dec. 19, 1939 |
| 2,234,523 | Fischer | Mar. 11, 1941 |
| 2,253,069 | Eckel et al. | Aug. 19, 1941 |
| 2,349,413 | Hemperly | May 23, 1944 |
| 2,361,374 | Abbott | Oct. 31, 1944 |

FOREIGN PATENTS

| Number | Country | Date |
|---|---|---|
| 435,557 | Great Britain | Sept. 23, 1935 |
| 494,574 | Great Britain | Oct. 24, 1938 |
| 522,593 | Great Britain | June 21, 1940 |